United States Patent
Sridharan et al.

(10) Patent No.: US 11,573,853 B2
(45) Date of Patent: Feb. 7, 2023

(54) ERROR CHECKING DATA USED IN OFFLOADED OPERATIONS

(71) Applicant: ADVANCED MICRO DEVICES, INC., Santa Clara, CA (US)

(72) Inventors: Vilas Sridharan, Boxborough, MA (US); Sudhanva Gurumurthi, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/218,535

(22) Filed: Mar. 31, 2021

(65) Prior Publication Data
US 2022/0318089 A1 Oct. 6, 2022

(51) Int. Cl.
G06F 3/06 (2006.01)
G06F 11/10 (2006.01)

(52) U.S. Cl.
CPC ............ *G06F 11/10* (2013.01); *G06F 3/0619* (2013.01); *G06F 3/0659* (2013.01); *G06F 3/0673* (2013.01)

(58) Field of Classification Search
CPC ...... G06F 11/10; G06F 3/0619; G06F 3/0659; G06F 3/0673
USPC ........................................................ 714/807
See application file for complete search history.

(56) References Cited

U.S. PATENT DOCUMENTS

| | | | |
|---|---|---|---|
| 8,812,898 B1 | 8/2014 | Lahon et al. | |
| 2003/0106942 A1* | 6/2003 | Ohya | G06Q 20/3576 235/492 |
| 2008/0130534 A1* | 6/2008 | Tomioka | H04L 1/1819 370/310 |
| 2010/0057932 A1* | 3/2010 | Pope | H04L 69/32 709/236 |
| 2012/0324321 A1* | 12/2012 | Chowdhury | H03M 13/09 714/E11.032 |
| 2014/0189212 A1* | 7/2014 | Slaight | G06F 13/102 710/22 |
| 2015/0163014 A1* | 6/2015 | Birrittella | H04L 1/1874 714/807 |
| 2016/0026523 A1* | 1/2016 | Cohen | H04L 1/0061 714/807 |
| 2018/0053545 A1 | 2/2018 | Son | |
| 2018/0089099 A1* | 3/2018 | Raj | G06F 12/10 |
| 2019/0114114 A1 | 4/2019 | Trika et al. | |

OTHER PUBLICATIONS

International Search Report and Written Opinion, PCT/US2022/021776, dated Jun. 28, 2022, 16 pages.

* cited by examiner

*Primary Examiner* — Albert Decady
*Assistant Examiner* — Enam Ahmed

(57) ABSTRACT

Error checking data used in offloaded operations is disclosed. A remote execution device receives a request from a host to store a data block in a memory region. The data block includes data and host-generated error checking information for the data. The remote execution device updates the data block by overwriting the host-generated error checking information with locally generated error checking information for the data. The data block is then stored in the memory region.

20 Claims, 9 Drawing Sheets

ERROR CHECKING DATA USED IN OFFLOADED OPERATIONS

BACKGROUND

Computing systems often include a number of processing resources (e.g., one or more processors), which may retrieve and execute instructions and store the results of the executed instructions to a suitable location. A processing resource (e.g., central processing unit (CPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry may be used to perform arithmetic operations such as addition, subtraction, multiplication, and/or division on operands. Typically, the processing resources (e.g., processor and/or associated functional unit circuitry) may be external to a memory array, and data is accessed via a bus between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a processor-in-memory (PIM) device, in which processing resources may be implemented internal and/or near to a memory, such that data processing is performed closer to the memory location storing the data rather than bringing the data closer to the processing resource for the purpose of computations. A PIM device may save time by reducing and/or eliminating external communications and may also conserve power.

DETAILED DESCRIPTION

Figure 1:
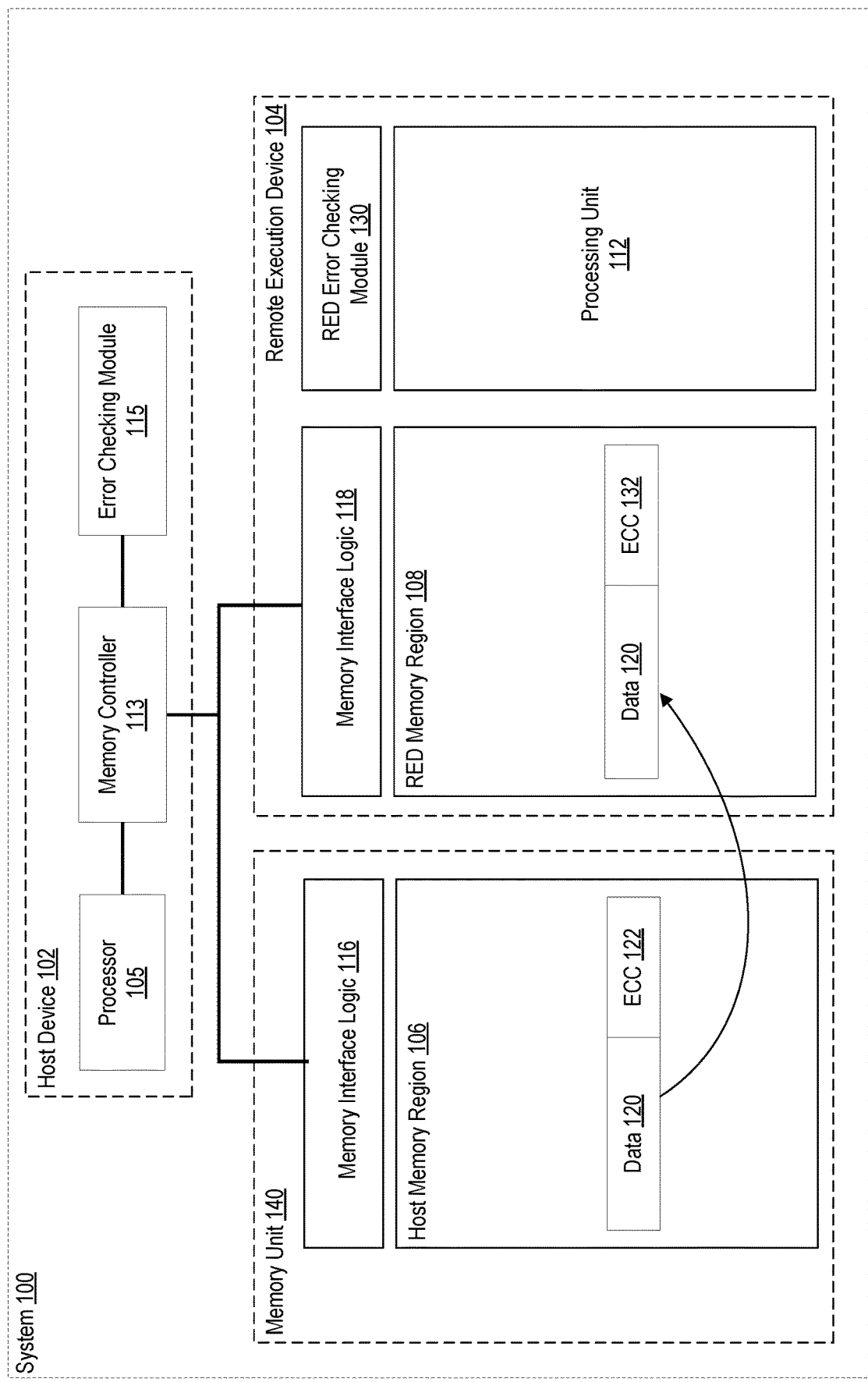
FIG. 1 sets forth a block diagram of an example system for error checking data used in offloaded operations according to embodiments of the present disclosure.

Processing-in-Memory (PIM) architectures support offloading instructions for execution in or near memory, such that bandwidth on the data link between the processor and the memory is conserved and power consumption of the processor may be reduced. Execution of offloaded instructions by, for example, a PIM device do not require loading data into local central processing unit (CPU) registers and writing data from local CPU storage back to the memory. PIM architectures typically include a PIM-enabled host (e.g., a CPU or graphic processing unit GPU) that is configured to execute PIM instructions for offloading operations to a PIM device. Typically, the PIM device is a memory device that implements compute capability (e.g., PIM compute logic) within the memory device, although the PIM device may also be tightly coupled to the memory device. For ease of explanation, it is assumed in this disclosure that the PIM device is a PIM-enabled memory device with PIM compute logic embedded within the memory device that implements the compute capability.

To support error detection for data written to a memory, a host may generate reliability, availability and serviceability (RAS) metadata for the data written to memory. This metadata is typically stored with the data in the memory device and used to perform an error detection check when the data is later retrieved from the memory device. For example, the host may apply an error detection function to the data read from memory to determine if the result of the function matches the metadata. A failure to satisfy this error detection check may indicate a failure to correctly retrieve the data from memory or a corruption of the data itself. A problem arises when that data is modified by a PIM operation because modification of the data may result in the RAS metadata becoming invalid. That is, when PIM-modified data is retrieved by the host, the result of the error detection function applied to the PIM-modified data will likely not match the RAS metadata stored with the data. Another problem is that the PIM device cannot use the RAS metadata generated by the host without knowledge of the host's error detection scheme. Thus, the data remains unprotected because the PIM-enabled memory device simply ignores the hosts error checking information.

One solution to this problem is to mirror the host-based error protection techniques in the memory device. However, this may require all PIM-enabled memory vendors and all PIM-enabled host vendors to agree on using the same error protection techniques, or may require a host to specifically configure the PIM-enabled memory device with the proprietary error detection techniques employed by the host. Very often, host vendors do not want to disclose these proprietary techniques. Thus, mirroring or exactly replicating the host-based error detection techniques in the PIM-enabled memory device may not be a viable solution. Moreover, for the PIM-enabled memory device to uses its own error checking scheme to track RAS metadata for operations performed within the PIM-enabled memory device, a separate buffer must be used to store the RAS metadata generated by the PIM-enabled memory device or additional space must be allocated for data received from the host to store the locally generated RAS metadata.

To address this and other issues, embodiments in accordance with the present disclosure leverage the space occupied by host-generated RAS metadata by overwriting host-generated RAS metadata with locally generated RAS metadata so that a remote execution device such as a PIM-enabled memory device may identify and correct on-device data errors. Before sending data to the remote execution device, the host performs an error check using the host-generated RAS metadata and marks any uncorrectable errors encountered. Before sending data to the host, the remote execution device performs an error check using the locally generated RAS metadata and marks any uncorrectable errors encountered.

An embodiment in accordance with the present disclosure is directed to a method of error checking data used in offloaded operations. The method includes identifying a request issued by a host to store a data block in a memory region, wherein the data block includes data and host-generated error checking information for the data. The method also includes updating the data block by overwriting the host-generated error checking information with locally generated error checking information for the data. The method also includes storing the updated data block in the memory region. In some implementations, the method may also include identifying a host-provided error indicator in the data block.

In some implementations, the memory region is coupled to a processing unit configured to execute operations offloaded from the host. In these implementations, the method may also include verifying the data using the locally generated error checking information upon reading the updated data block from the memory region into the processing unit. In these implementations, the method may also include generating, by the processing unit, new data and generating error checking information for the new data. In such implementations, the method also includes storing the new data in a new data block and the locally generated error checking information for the new data in a new memory block in the memory region, wherein the new data block is marked to indicate that the new data was generated from an offloaded operation. The memory region and processing unit may be embodied in a processing-in-memory device.

In some implementations, the method also includes verifying the new data using the locally generated error checking information for the new data prior to providing the new data to the host. In these implementations, the method may also include marking the new data with an error indicator when an unrecoverable error is detected.

Another embodiment in accordance with the present disclosure is directed to an apparatus for error checking data used in offloaded operations, the apparatus comprising a processing unit configured to execute operations offloaded from the host, a memory region coupled to the processing unit, and logic circuitry configured to identify a request issued by the host to store a data block in a memory region, wherein the data block includes data and host-generated error checking information for the data. The logic circuitry is also configured to update the data block by overwriting the host-generated error checking information with locally generated error checking information for the data. The logic circuitry is also configured to store the updated data block in the memory region.

In some implementations, the logic circuitry is further configured to identify a host-provided error indicator in the data block. In some implementations, the logic circuitry is further configured to the data using the locally generated error checking information upon reading the updated data block from the memory region into the processing unit. In some implementations, the logic circuitry is further configured to generate error checking information for new data generated by the processing unit and store the new data in a new data block and the locally generated error checking information for the new data in a new memory block in the memory region, where the new data block is marked to indicate that the new data was generated from an offloaded operation.

In some implementations, the logic circuitry is further configured to verify the new data using the locally generated error checking information for the new data prior to providing the new data to the host. In these implementations, the logic circuitry may be further configured to mark the new data with an error indicator when an unrecoverable error is detected. In some implementations, the apparatus is a processing-in-memory (PIM) device.

Another embodiment in accordance with the present disclosure is directed to system for error checking data used in offloaded operations. The system includes a host including a processor configured to configure a remote execution device to execute operations offloaded from a processor of the host. The host is also configured to perform an error check on the data block read from host memory using host-generated error checking information stored in the data block prior to copying the data block to the remote execution device. The host is further configured to send a request to store the data block in the memory region of the remote execution device. The remote execution device is configured to identify a request issued by a host to store a data block in a memory region, wherein the data block includes data and host-generated error checking information for the data. The remote execution device is also configured to update the data block by overwriting the host-generated error checking information with locally generated error checking information for the data. The remote execution device is also configured to store the updated data block in the memory region.

In some implementations, the remote execution device may be further configured to generate new data, generate error checking information for the new data, and store the new data in a new data block and the locally generated error checking information for the new data in a new memory block in the memory region, wherein the new data block is marked to indicate that the new data was generated from an offloaded operation. In some implementations, the remote execution device may be further configured to verify the new data using the locally generated error checking information for the new data prior to providing the new data to the host. In these implementations, the remote execution device may be further configured to mark the new data with an error indicator when an unrecoverable error is detected. In some implementations, the remote execution device may be a processing-in-memory (PIM) device.

Embodiments in accordance with the present disclosure will be described in further detail beginning with FIG. 1. FIG. 1 sets forth a block diagram of an example system 100 for error checking data used in offloaded operations in accordance with the present disclosure. The example system 100 of FIG. 1 includes a host device 102 coupled to remote execution device 104, such as an accelerator, a coprocessor, processing-in-memory (PIM) unit, or other types of remote execution devices that act on behalf on the host processor 102 as a target for offloaded execution of a compute kernel. The host device 102 includes at least one processor 105 (e.g., a central processing unit (CPU) or graphics processing unit (GPU)) that executes instructions including instruction to read and write data to a host memory region 106, instructions to generate commands for offloaded execution by the remote execution device 104, and instructions to read and write data to a remote execution device memory region 108. The remote execution device memory region 108 and the host memory region 106 may be embodied in the same memory device (e.g., chip or module), or may be embodied in separate memory devices. A remote execution unit 112 is coupled to the remote execution device memory region 108.

The remote execution unit 112 includes logic, an ALU, registers, and other components to execute a compute kernel offloaded by the host device 102. In some examples, when a compute kernel is offloaded for execution by the remote execution unit 112, data utilized by the kernel is copied from the host memory region 106 to the remote execution device memory region 108. In these examples, the copied data may be realigned to provide more efficient execution of the offloaded code.

In some examples, the remote execution device 104 is a PIM-enabled memory device such as a memory bank configured with a PIM unit as the remote execution unit. As such, this PIM-enabled memory bank may be embodied in the same memory device as other memory banks that are designated as host memory. In other examples, the remote execution device 104 is an accelerator or coprocessor with dedicated memory that includes the remote execution device memory region 108, such that the remote execution device memory region 108 and the host memory region are embodied in distinct memory devices. In various examples, the remote execution device 104 is a "remote" device in that execution logic for executing offloaded instructions (e.g., PIM commands) is not part of the processor 105. For example, the remote execution device 104 may be implemented on the same chip or in the same package as the host device 102 while remaining "remote" from the processor 105 with respect to execution locality. In some examples, the host device 102 and the remote execution device 104 of the system 100 are integrated on the same chip (e.g., a system-on-chip (SoC)). In other examples, the system 100 implements a system-in-package (SiP) architecture in which the host device 102 and its components (e.g., as an SoC) are placed on an interposer wafer along with the remote execution device 104 in the same semiconductor package.

A memory controller 113 of the host processor 102 receives memory requests generated from the executed instructions and interprets the requests into memory commands that are transmitted to the host memory region 106 and the remote execution device memory region 108 over a memory channel. Memory interface logic 116, 118 corresponding to the host memory region 106 and the remote execution device memory region 108, respectively, receives the commands (and associated data) and fulfills the request by reading or writing data to the respective memory regions.

To meet RAS objectives, the host device 102 may employ error detection and correction techniques when reading and writing data to the host memory region 106. One such technique is to generate error detection and correction information for data that is written to memory. The error detection and correction information may include an error correcting code (ECC), a cyclic redundancy check (CRC), a checksum, parity information, and the like. For the example of FIG. 1, it is assumed that the error correction and detection code is an ECC. ECC checkbits may be stored as metadata with the data that is written to the host memory region 106. When the data is subsequently read from the host memory region 106, checkbits are generated for the retrieved data to determine whether the checkbits match the checkbits that were stored in the metadata with the data. If there is a mismatch, an error may have occurred in reading the data from the memory device.

Consider the example depicted in FIG. 1 where the host device 102 executes an operation to write data 120 to the host memory region 106 (via memory controller 113 and memory interface logic 116) in a memory unit 140. Prior to issuing the write request for the data 120, a host error checking module 115 applies a function to generate ECC checkbits 122 for the data 120. The data 120 and ECC checkbits 122 are stored in the host memory region 106 as part of the write operation. Subsequently, when the data 120 and ECC checkbits 122 are read from the host memory region 106, the error checking module 115 verifies the integrity of the received data 120 by applying the same function to generate a new ECC checkbits for the data 120 and comparing the new ECC checkbits to the stored ECC checkbits 122. If there is a mismatch, a read error or corruption of the data 120 has likely occurred. In some cases, the ECC checkbits 122 and ECC function may be used to correct the error. Otherwise, the data may be marked as corrupted.

Continuing the above example, the data 120 may be required to execute a compute kernel offloaded to the remote execution device 104. As such, the data 120 is copied to the remote execution device memory region 108. As part of offloading the kernel, the data 120 (and other data utilized by the kernel) is read from the host memory region 106 and an ECC check is performed by the host error checking module 115 using the ECC checkbits 122 to verify the integrity of the data 120 prior to writing the data 120 and the ECC checkbits 122 to the remote execution device memory region 108. However, without knowledge of the ECC scheme used by the host device 102, the remote execution device 104 is unable to use the ECC checkbits 122 generated by the host device 102 to perform an integrity check. Moreover, without knowledge of the ECC scheme used by the host device 102, the remote execution device 104 cannot correctly update the ECC checkbits 122 when the data 120 is modified by the remote execution device, and a subsequent read of the modified data with the original ECC checkbits by the host device 102 will likely cause the host error checking module 115 to mistakenly identify a data read/corruption error. Because the remote execution device 104 cannot replicate the ECC scheme of the host device 102 to verify the data 120 or update the host-generated ECC checkbits 122, this information needlessly occupies metadata bits for the data 120.

In accordance with embodiments of the present disclosure, the remote execution device 104 overwrites the host-generated ECC checkbits 122 with a locally generated ECC checkbits 132 generated by a remote execution device error checking module 130 and uses the locally generated ECC checkbits 132 to meet RAS objectives when reading and writing data between the remote execution unit 114 and the remote execution device memory region 108. In this way, the remote execution device 104 leverages the space occupied by the host-generated ECC checkbits 122 so that no additional space allocation is required to store local error detection and correction information used to detect and correct read and write errors between the remote execution unit 114 and the remote execution device memory region 108. In some implementations, the remote execution device 104 overwrites the host-generated ECC checkbits 122 with locally generated ECC checkbits 132 when the data 120 is copied from the host memory region 106 to the remote execution device memory region 108. When the data 120 is read from the remote execution device memory region 108 by the remote execution unit 114, the ECC checkbits 132 and the local ECC scheme is used to verify the integrity of the data 120. When the data 120 is modified, the modified data 120 and updated ECC checkbits 132 are written to the remote execution device memory region 108. In some examples, the ECC checkbits 132 is used to verify the integrity of the data 120 when the data 120 is read from the remote execution device memory region 108 by the host device 102 or copied to the host memory region 106. In these examples, in the event that an uncorrectable error is detected, the error may be marked to the host device 102 for error handling by the host device 102. In some implementations, the data 120 may marked as containing (or potentially containing) remotely modified data, such that the bits containing ECC information are not valid ECC bits for the host-based ECC scheme. That is, the remote execution device 104 may indicate to the host device 102 that the ECC checkbits included with the data 120 are not host-generated ECC or that the data 120 is remotely modified data.

Figure 2:
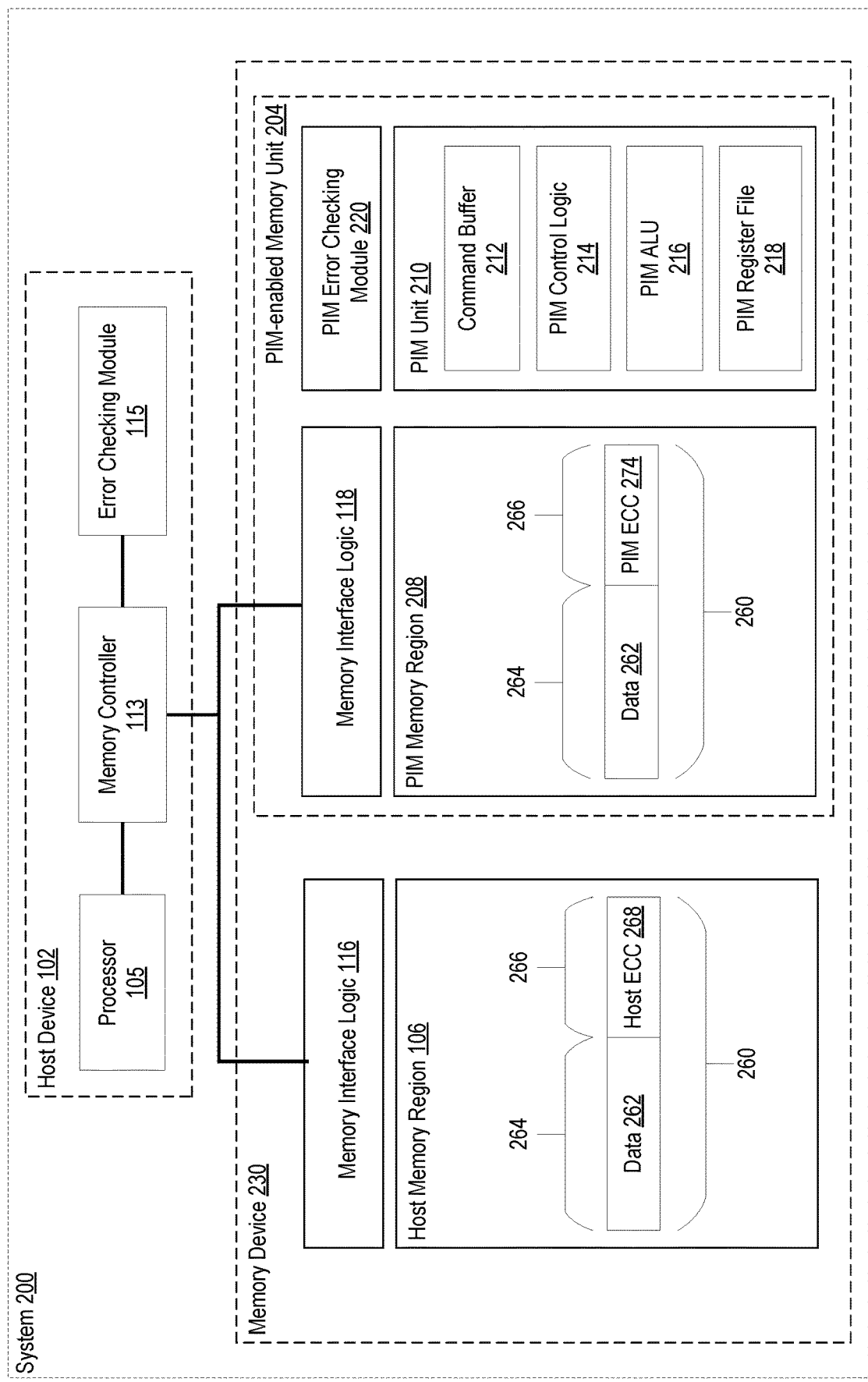
FIG. 2 sets forth a block diagram of an example system for error checking data used in offloaded operations according to embodiments of the present disclosure.

For further explanation, FIG. 2 sets forth a block diagram of another example system 200 for error checking data used in offloaded operations in accordance with the present disclosure. In the example of FIG. 2, the remote execution device discussed above is embodied as a PIM-enabled memory unit 204 that includes a PIM unit 210 (similar to the remote execution unit 114 of FIG. 1) coupled to a PIM memory region 208 (similar to the remote execution device memory region 108 of FIG. 1). In some implementations, the PIM memory region 208 and the host memory region 106 are separate regions (e.g., separate banks or groups of banks) of the same memory device 230, such that the host memory region 106, PIM memory region 208, and PIM unit 210 are embodied in the same chip, module, or package. In other implementations, the PIM memory region 208 and the host memory region 106 are embodied in distinct memory devices.

In the example of FIG. 2, the PIM unit 210 includes a command buffer 212 that stores a kernel of compute instructions offloaded from the host device 102 for remote execution on the PIM-enabled memory unit 204. The PIM unit also includes a PIM ALU 216 for executing instructions in the compute kernel and a PIM register file 218 for temporarily holding operands and results of those operations. When the host device 102 configures the PIM-enabled memory unit 204 to execute the kernel, the host device 102 writes the kernel to the command buffer 212 and copies data utilized by the kernel to the PIM memory region 208 from the host memory region 106. The data copied into the PIM memory region may be realigned by the host device 102 such that the data in the PIM memory region is organized in an address space used by the compute kernel. The PIM unit 210 also includes PIM control logic 214 such as a program counter, scheduler, and the like to facilitate execution of the compute kernel. By way of example and not limitation, the PIM-enabled memory unit 204 may be configured with a kernel to load data from a location in the PIM memory region 208 into a register r0 of the PIM register file 218, and load data received from the host device 102 that was computed by the host processor 105 into a register r1 of the PIM register file 218. In this example, the PIM ALU 216 adds the value in register r1 to the value in register r0 and stores the result in register r0. The result from register r0 is then written back to the location in the PIM memory region 208.

As discussed above, when the host device 102 reads a data block 260 from the host memory region 106 for copy to the PIM memory region 208, the host device 102 verifies the integrity of the data 262 in a data portion 264 of the data block 260 using host-generated ECC checkbits 268 in an ECC portion 266 of the data block 260 and the host's ECC scheme. If the host device 102 identifies an uncorrectable error when verifying the integrity of the data 262, a poison bit for the data may be set in the data block 260 for handling by the PIM-enabled memory device 204. In some examples, when writing the data block 260 to the PIM memory region 208, the data block 260 is marked (e.g., in control information) as including PIM data. As used herein, "PIM data" is data that used by the PIM-enabled memory unit 204 for carrying out PIM operations.

When the data block 260 is copied into the PIM memory region 208, a PIM error checking module 220 generates PIM ECC checkbits 274 for the data 262 using a PIM ECC scheme and writes the PIM ECC checkbits 274 into the ECC portion 266 of the data block 260. When data 262 is read into a register in the PIM register file 218 of the PIM unit 210 from the PIM memory region 208, the PIM error checking module 220 verifies the integrity of the data 262 using the PIM ECC checkbits 274. When new or modified data is written from a register in the PIM register file 218 of the PIM unit 210 to the data block 260 in the PIM memory region 208, the PIM error checking module 220 generates updated PIM ECC checkbits 274 that is written into the data block 260.

When the data block 260 is read by the host device from the PIM memory region 208, the PIM error checking module 220 verifies the integrity of the data 262 using the PIM ECC checkbits 274. If the PIM-enabled memory device 204 identifies an uncorrectable error when verifying the integrity of the data 262, a poison bit for the data may be set in the data block 260 for handling by the host device 102. The data block 260 is marked as containing PIM data and/or PIM ECC checkbits, such that the host device 102 recognizes that the ECC checkbits in the ECC portion 266 should not be relied upon.

Figure 3:
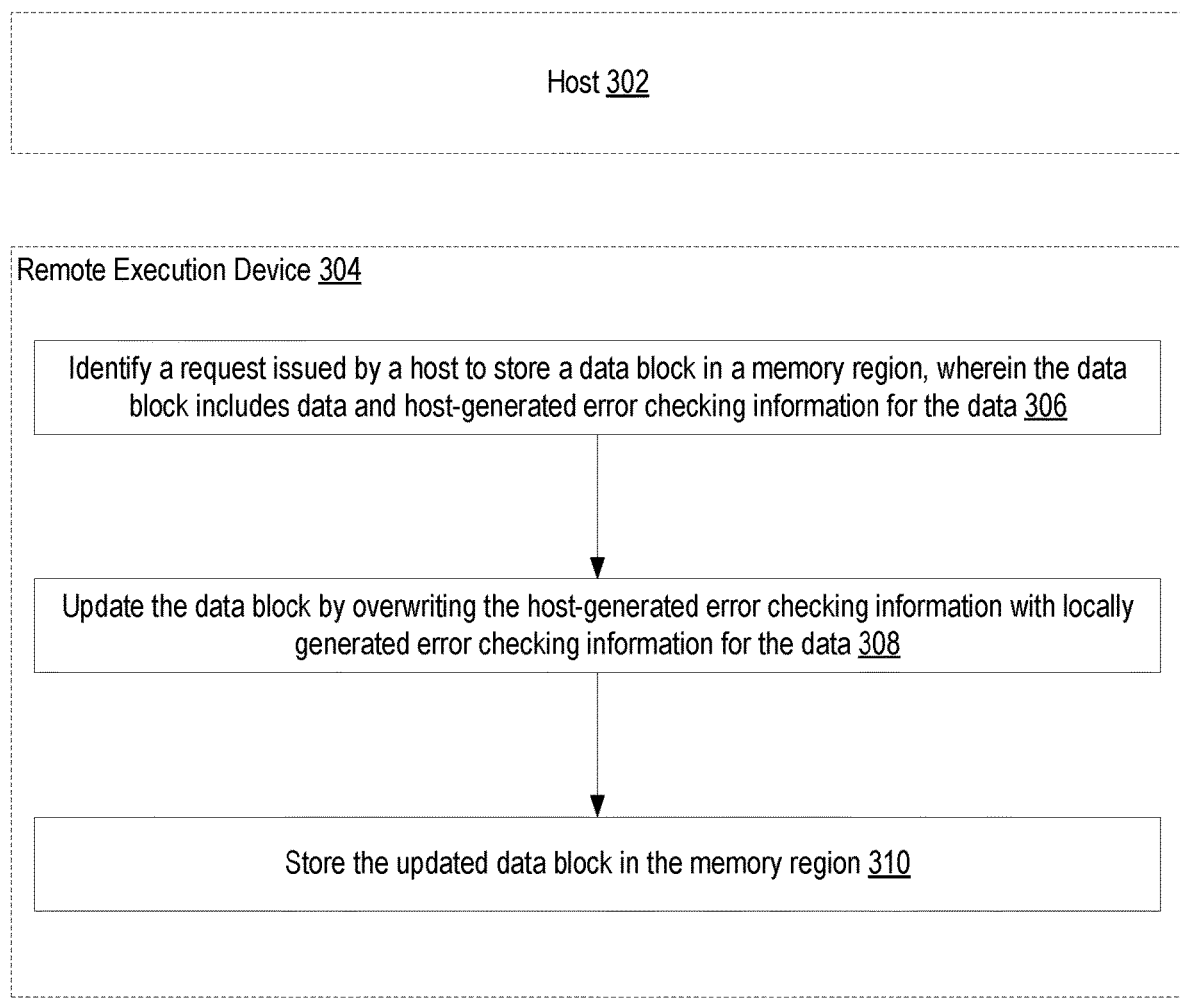
FIG. 3 sets forth a flow chart illustrating another example method of error checking data used in offloaded operations in accordance with embodiments of the present disclosure.

For further explanation, FIG. 3 sets forth a flow chart illustrating an example method for error checking data used in offloaded operations in accordance with the present disclosure. The example in FIG. 3 includes a host 302 that may be similar to host device 102 discussed above with reference to FIGS. 1 and 2. The host 302 depicted in FIG. 3 may include the same, fewer, or additional components as the storage systems described above. The example in FIG. 3 also includes a remote execution device 304 that may be similar the remote execution device 104 or the PIM-enabled memory device 204 described above with reference to FIGS. 1 and 2. The remote execution device 304 depicted in FIG. 3 may include the same, fewer, or additional components as the storage systems described above. In some examples, the remote execution device 304 includes a memory region coupled to a processing unit configured to execute operations offloaded from the host. In some implementations, the remote execution device 304 is a PIM-enabled memory unit such as the PIM-enabled memory unit 204 embodied in a memory device such as the memory device 230, as described above with reference to FIG. 2. Although many of the following examples are described in the context of a PIM-enabled memory unit, readers will appreciate that the following examples may also be implemented in context of an accelerator or coprocessor that is not embodied in a memory device.

As discussed above, when the host 302, initiates remote execution of operations offloaded from a processor, a compute kernel and the data targeted by the compute kernel is copied into the remote execution device 304. In particular, one or more data blocks utilized by the offloaded operations is copied into a memory region of the remote execution device 304. For example, the host 302 issues a request to write the one or more data blocks into the memory region that is coupled to the remote processing unit. In a particular example, the host 302 initiates the offloading of a PIM compute kernel, including a request to write one or more data blocks from a host memory region to a PIM memory region. In this example, the request is received by memory control logic in the PIM-enabled memory unit that includes the PIM memory region. The one or more data blocks include a data and a metadata and may also include control bits. that includes error checking information. For example, the error checking information may include a number of ECC checkbits for the data.

The method in FIG. 3 includes identifying 306 a request issued by a host to store a data block in a memory region, wherein the data block includes data and host-generated error checking information for the data. In some examples, identifying 306 a request issued by a host to store a data block in a memory region, wherein the data block includes data and host-generated error checking information for the data is carried out by the remote execution device 304 receiving a request to write a data block into to a remote processing device memory region that is coupled to the processing unit. In some implementations, the host initiates a copy operation in which the data block is copied from to the memory region from a host memory region where a host-based error checking technique is employed. In the host-based error checking technique, the host generates error checking information for data and stores the error checking information with the data in a data block. For example, the error checking information may be ECC information such as checkbits. In some examples, identifying 306 a request issued by a host to store a data block in a memory region, wherein the data block includes data and host-generated error detection information for the data includes identifying that the host-generated error checking information may be overwritten with locally-generated error checking information. Identifying that the host-generated error checking information may be overwritten with locally-generated error checking information may be carried out through inference based on the memory region to which the request is directed or based on a control information in the data block.

In a particular example where the remote execution device is a PIM-enabled memory unit, the host initiates a copy operation to copy the data block from the host memory region to the PIM memory region. The PIM-enabled memory unit receives the request to write the data block to the PIM memory region and receives the data block in a write buffer. The data block, which is copied from the host memory region, includes host-generate error checking information. In some examples, the data block may also include control information indicating that the data block includes PIM data.

The method in FIG. 3 also includes updating 308 the data block by overwriting the host-generated error detection information with locally generated error checking information for the data. In some examples, updating 308 the data block by overwriting the host-generated error detection information with locally generated error checking information for the data is carried out by an error checking module in the remote execution device 304 generating error checking information for the data in the data block. For example, the locally generated error detection information may be ECC checkbits encoded using a local ECC scheme that is different than the host-based ECC scheme. In these examples, updating 308 the data block by overwriting the host-generated error detection information with locally generated error checking information for the data is further carried out by storing the locally generated error detection information in a location in the data block occupied by the host-generated error checking information. For example, host-based ECC checkbits in the data block are replaced with locally generated ECC checkbits. Accordingly, error checking information used by the remote execution device is created for data in the data block without allocating additional space for the data block in the memory region, and without requiring separate storage for the error checking information.

In a particular example, wherein the remote execution device 304 is a PIM-enabled memory unit (e.g., the PIM-enabled memory unit 204 in FIG. 2), a PIM-enabled memory unit updates the data block by overwriting the host-generated error detection information with error checking information generated by an error checking module in the PIM-enabled memory unit generating ECC checkbits using a PIM-based ECC scheme that is different than the host-based ECC scheme. The PIM-enabled memory unit overwrites the host-generated ECC checkbits with the PIM ECC checkbits, for example, while the data block is in the write buffer. In some examples, the PIM-enabled memory unit overwrites the host-generated ECC checkbits with the PIM ECC checkbits automatically in response to a request to write data to the PIM memory region. In other examples, the PIM-enabled memory unit overwrites the host-generated ECC checkbits with the PIM ECC checkbits based on control information in the data block indicating the data block includes PIM data, or that the host-generated ECC checkbits may be overwritten.

The method in FIG. 3 also includes storing 310 the updated data block in the memory region. In some examples, storing 310 the updated data block in the memory region is carried out by the remote execution device 304 storing the data block, in which the locally generated error checking information has replaced the host-generated error checking information, in the memory region coupled to the processing unit in the remote execution device 304. In a particular example, the PIM-enabled memory unit stores the updated data block, which includes the PIM ECC checkbits in place of the host-generated ECC checkbits, in the PIM memory region that is coupled to a PIM unit.

Figure 4:
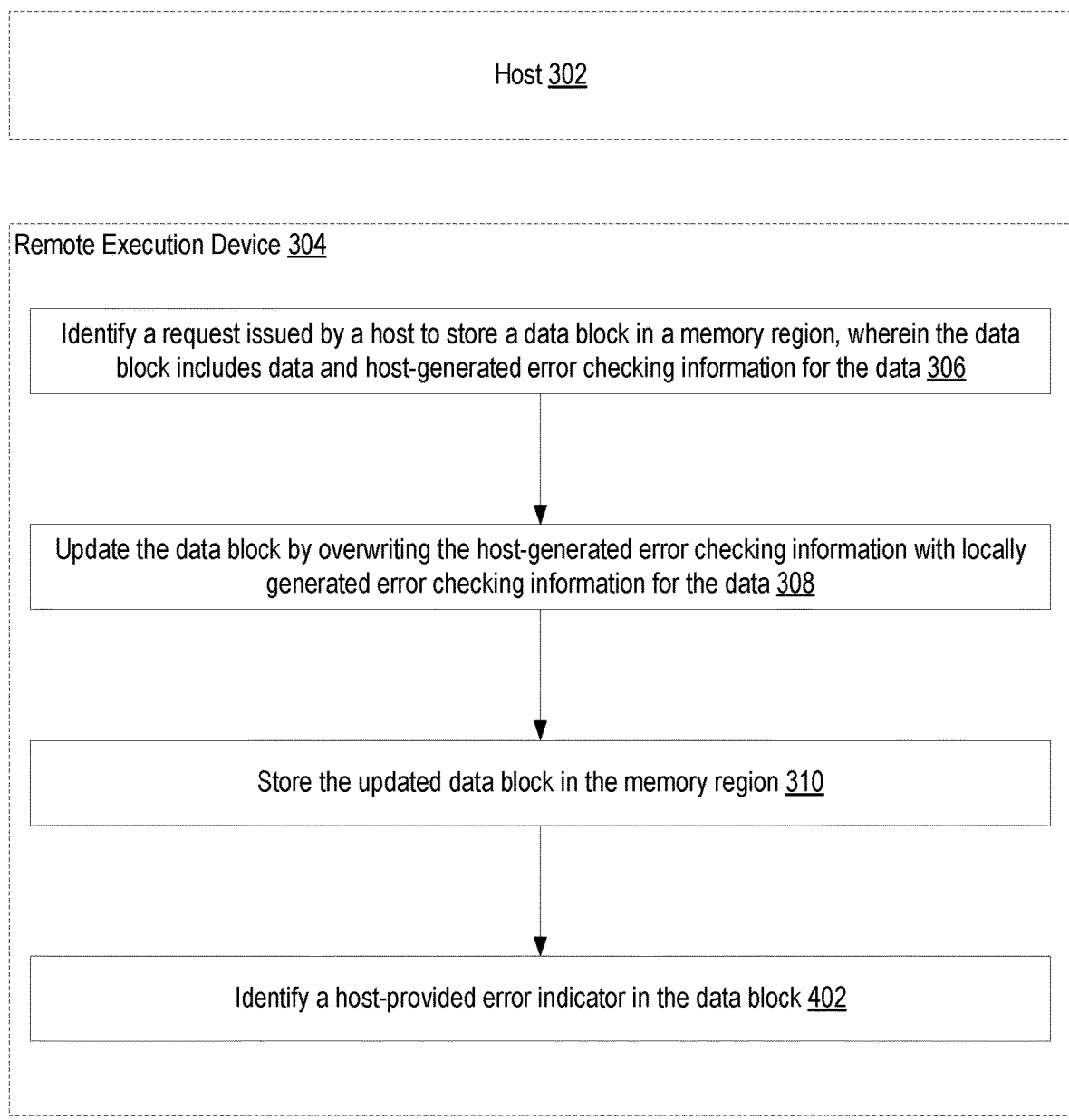
FIG. 4 sets forth a flow chart illustrating another example method of error checking data used in offloaded operations in accordance with embodiments of the present disclosure.

For further explanation, FIG. 4 sets forth a flow chart illustrating an example method for error checking data used in offloaded operations in accordance with the present disclosure. Like the example method in FIG. 3, the method in FIG. 4 also includes identifying 306 a request issued by a host to store a data block in a memory region, wherein the data block includes data and host-generated error checking information for the data updating 308 the data block by overwriting the host-generated error detection information with locally generated error checking information for the data, and storing 310 the updated data block in the memory region.

The method in FIG. 4 also includes identifying 402 a host-provided error indicator in the data block. As discussed above, with respect to host device in FIGS. 1 and 2, a host 302 may read one or more data blocks from a host memory region and perform an error check on the data blocks prior to writing the data blocks to the remote execution device memory region. When the host 302 encounters an uncorrectable error in a data block, the data block is marked with the error. For example, the host 302 marks the data block with a poison bit. In some examples, identifying 402 a host provided error indicator in the data block is carried out by the remote execution device 304 detecting a marker in the data block that was included by the host 302. For example, the marker may be a poison bit.

Figure 5:
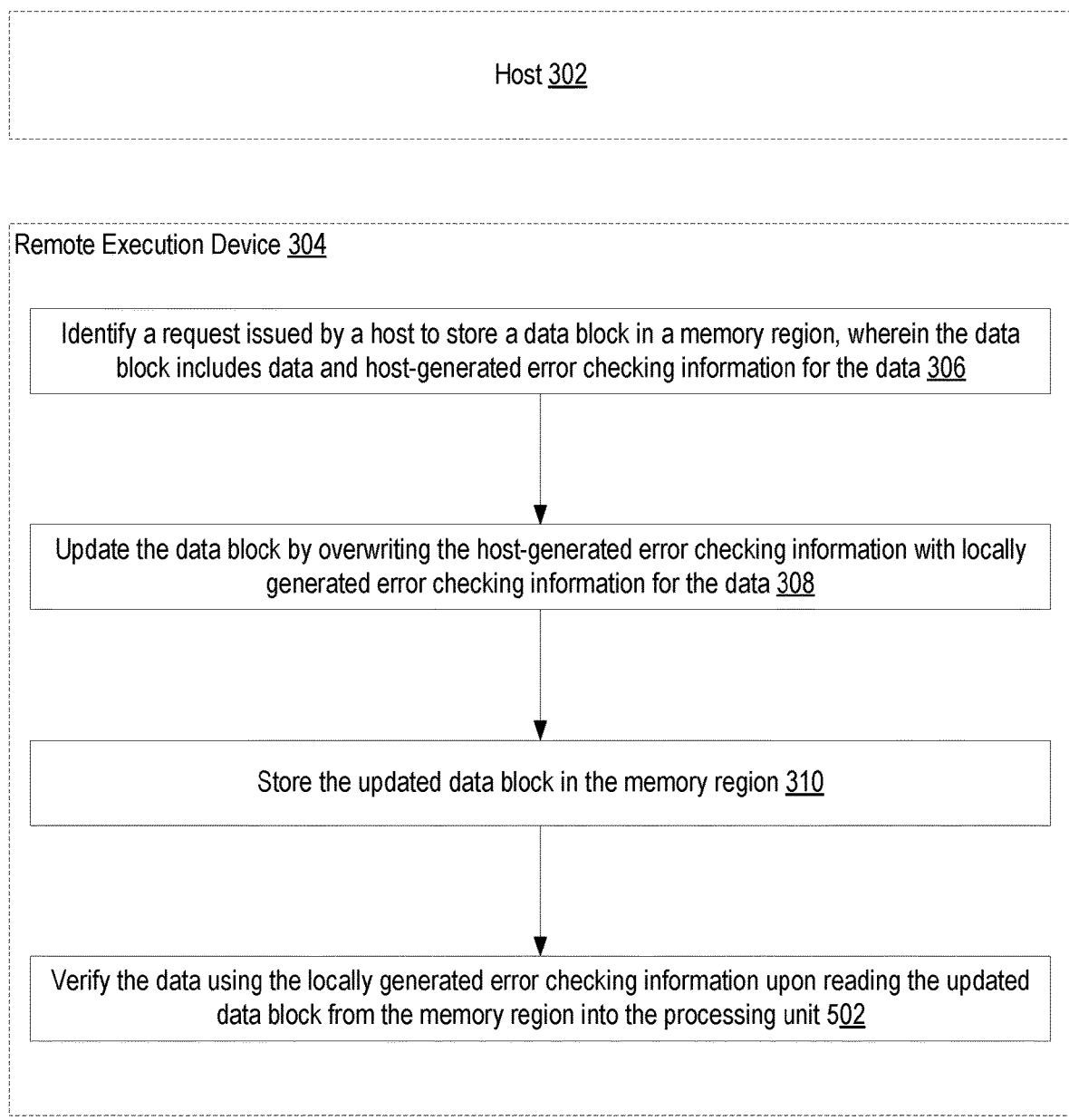
FIG. 5 sets forth a flow chart illustrating another example method of error checking data used in offloaded operations in accordance with embodiments of the present disclosure.

For further explanation, FIG. 5 sets forth a flow chart illustrating an example method for error checking data used in offloaded operations in accordance with the present disclosure. Like the example method in FIG. 3, the method in FIG. 5 also includes identifying 306 a request issued by a host to store a data block in a memory region, wherein the data block includes data and host-generated error checking information for the data updating 308 the data block by overwriting the host-generated error detection information with locally generated error checking information for the data, and storing 310 the updated data block in the memory region.

The method in FIG. 5 also includes verifying 502 the data using the locally generated error checking information upon reading the updated data block from the memory region into the processing unit. In some examples, verifying 502 the data using the locally generated error checking information upon reading the updated data block from the memory region into the processing unit is performed in response to the processing unit executing an operation to read data from the remote execution device memory region into a register of the processing unit. In some examples, verifying 502 the data using the locally generated error checking information upon reading the updated data block from the memory region into the processing unit is carried out by an error checking module in the remote execution device 304 decoding the error checking information generating error checking information for the data in the data block using the local error checking scheme and comparing the generated error checking information with the error checking information stored in the data block. For example, the remote execution device 304 may use a local ECC scheme to generate ECC checkbits for the data in the data block and compare the generated ECC checkbits to the stored ECC checkbits in the data block. If an error is encountered, the remote execution device 304 may attempt to correct the error using the error checking information.

In a particular example where the remote execution device is a PIM-enabled memory unit (e.g., the PIM-enabled memory unit 210 in FIG. 2), verifying 502 the data using the locally generated error checking information upon reading the updated data block from the memory region into the processing unit is performed in response to the PIM unit encountering a PIM operation to load PIM data from the PIM memory region. When the PIM unit reads data from the data block into a register in the PIM register file, the PIM error checking module generates ECC checkbits for the data and compares the generated ECC checkbits to the ECC checkbits in the data block. If an error is encountered, the PIM unit attempts to correct the error in the data prior to reading the data into the register. If the error cannot be corrected, the load operation is quashed and the data is marked corrupt.

Figure 6:
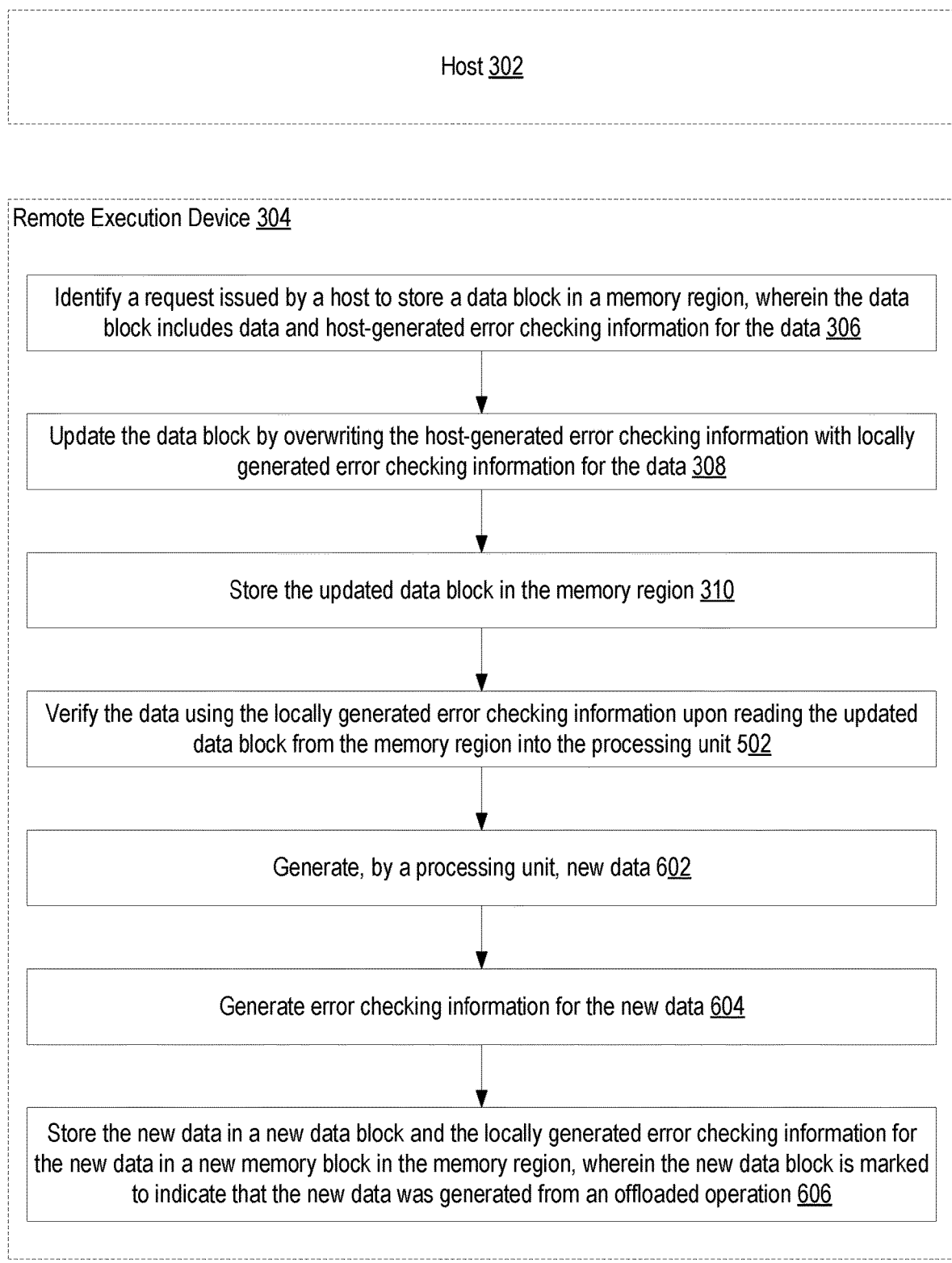
FIG. 6 sets forth a flow chart illustrating another example method of error checking data used in offloaded operations in accordance with embodiments of the present disclosure.

For further explanation, FIG. 6 sets forth a flow chart illustrating an example method for error checking data used in offloaded operations in accordance with the present disclosure. Like the example method in FIG. 5, the method in FIG. 6 also includes identifying 306 a request issued by a host to store a data block in a memory region, wherein the data block includes data and host-generated error checking information for the data updating 308 the data block by overwriting the host-generated error detection information with locally generated error checking information for the data, storing 310 the updated data block in the memory region, and verifying 502 the data using the locally generated error checking information upon reading the updated data block from the memory region into the processing unit.

The method in FIG. 6 also includes generating 602, by the processing unit, new data. In some examples, generating 602, by the processing unit, new data is carried out by the processing unit in the remote execution device 304 generating data from executing an operation that was offloaded by the host 302. In these examples, generating new data may include modifying data in the updated data block or creating data. The new data resulting from the operation is temporarily stored in a register in the processing unit. In a particular example where the remote execution device 304 is a PIM-enabled memory unit (e.g., the PIM-enabled memory unit 210 in FIG. 2), generating 602, by the processing unit, new data is carried out by the PIM processing unit executing a PIM operation that was offload from the host 302 to generate PIM data. The PIM operation modifies data in a PIM register that was loaded from the PIM memory region and stores the result in the PIM register or a in a different PIM register.

The method in FIG. 6 also includes generating 604 error checking information for the new data. In some examples, generating 604 error checking information is carried out by an error checking module in the remote execution device 304 generating error checking information for the new data. For example, the error checking module may use an ECC scheme to generate ECC checkbits for the new data. In a particular example where the remote execution device 304 is a PIM-enabled memory unit (e.g., the PIM-enabled memory unit 210 in FIG. 2), generating 604 error checking information is carried out by a PIM error checking module calculates new ECC checkbits for PIM data resulting from a PIM operation.

The method in FIG. 6 also storing 606 the new data and the locally generated error checking information for the new data in a new memory block in the memory region, wherein the new data block is marked to indicate that the new data was generated from an offloaded operation. In some examples, storing 606 the new data and the locally generated error checking information for the new data in a new memory block in the memory region, wherein the new data block is marked to indicate that the new data was generated from an offloaded operation is carried out by the remote execution device 304 writing the new data from a register of the processing unit along with the generated error checking information for the new data into a data block in the memory region coupled to the processing unit. For example, the new data block includes the new data generated from the offloaded operation and the ECC checkbits calculated for the new data. The new data block may be written from the register in the processing unit to the same address in the memory region as the updated data block, thus overwriting the updated data block, or the new data block may be written to a different address. The new data block is marked to indicate that the data in the data block was generated from an offloaded operation. Thus, when subsequently read by the host, the host may recognize that the new data block does not include host-generated error checking information. In some examples, marking the new data block to indicate that the data in the data block was generated from an offloaded operation is carried out by setting a control bit in the new data block.

In a particular example where the remote execution device 304 is a PIM-enabled memory unit (e.g., the PIM-enabled memory unit 210 in FIG. 2), storing 606 the new data and the locally generated error checking information for the new data in a new memory block in the memory region, wherein the new data block is marked to indicate that the new data was generated from an offloaded operation is carried out by the PIM-enabled memory unit writing PIM data from a PIM register along with the PIM ECC checkbits into a new data block in the PIM memory region. The new data block is marked as containing PIM data, for example, by setting a control bit in the new data block.

Figure 7:
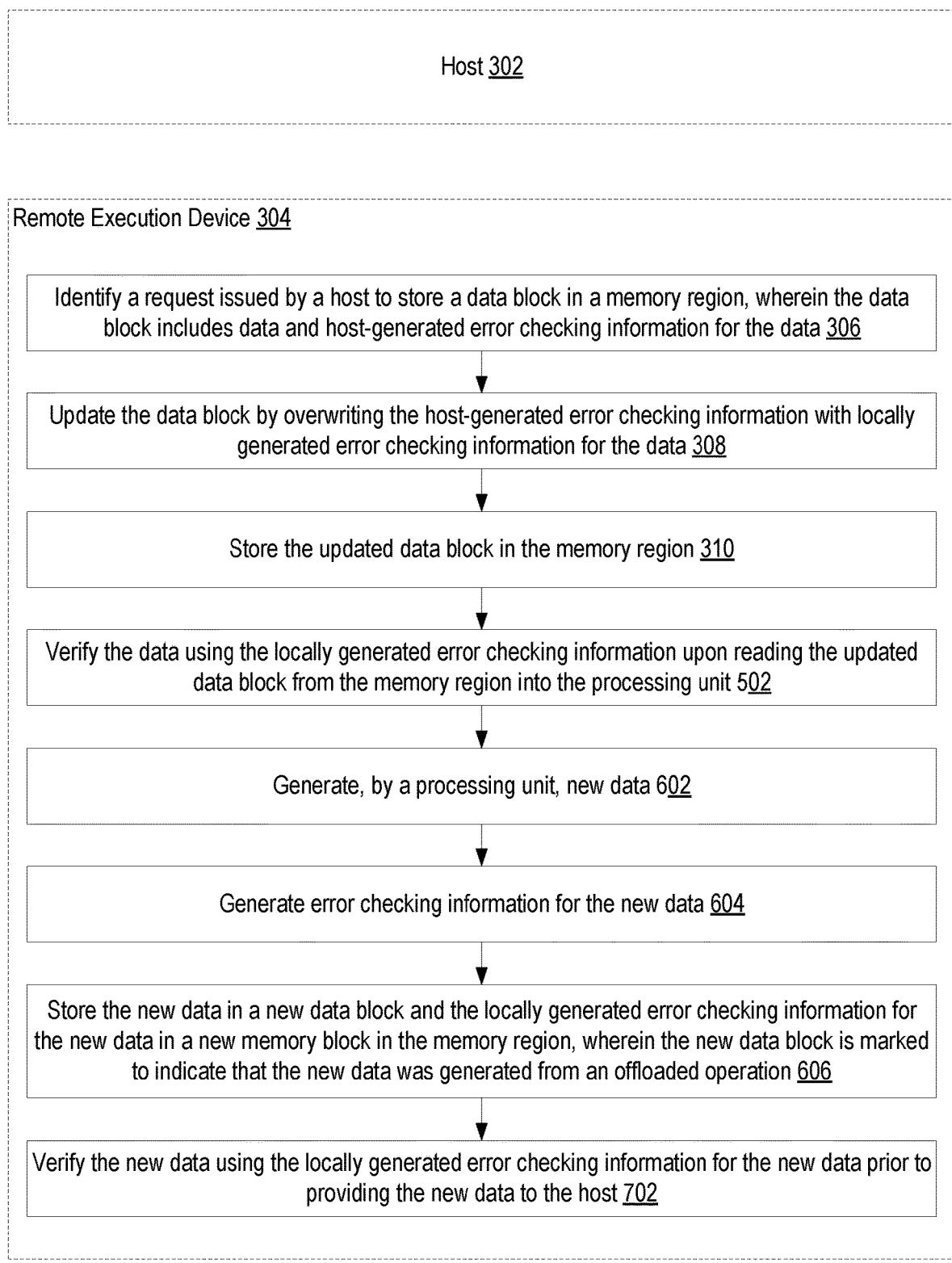
FIG. 7 sets forth a flow chart illustrating another example method of error checking data used in offloaded operations in accordance with embodiments of the present disclosure.

For further explanation, FIG. 7 sets forth a flow chart illustrating an example method for error checking data used in offloaded operations in accordance with the present disclosure. Like the example method in FIG. 6, the method in FIG. 7 also includes identifying 306 a request issued by a host to store a data block in a memory region, wherein the data block includes data and host-generated error checking information for the data updating 308 the data block by overwriting the host-generated error detection information with locally generated error checking information for the data, storing 310 the updated data block in the memory region, verifying 502 the data using the locally generated error checking information upon reading the updated data block from the memory region into the processing unit, generating 602, by the processing unit, new data, generating 604 error checking information for the new data, and storing 606 the new data and the locally generated error checking information for the new data in a new memory block in the memory region, wherein the new data block is marked to indicate that the new data was generated from an offloaded operation.

The method in FIG. 7 also includes verifying 702 the new data using the locally generated error checking information for the new data prior to providing the new data to the host. In some examples, verifying 702 the new data using the locally generated error checking information for the new data prior to providing the new data to the host is carried out by the error checking module in the remote execution device 304 generating error checking information for the data in the new data block using the local error checking scheme and comparing the generated error checking information with the error checking information stored in the new data block. For example, the remote execution device 304 generates ECC checkbits for the data in the data block and compares the generated ECC checkbits to the stored ECC checkbits in the data block. If an error is encountered, the remote execution device 304 may attempt to correct the error using the error checking information. In some examples, verifying 702 the new data using the locally generated error checking information for the new data prior to providing the new data to the host is carried out in response to completing the offloaded operations or in response to a read request. In some examples, providing the new data to the host is carried out by copying the data directly from the remote execution device memory region to the host memory region. In other examples, providing the new data to the host is carried out by sending the data to the host in response to a read request. In some implementations, providing the new data to the host includes providing the entire data block including the data, control information, and locally generated error checking information. In other implementations, providing the new data to the host includes providing only the data and control information.

In a particular example where the remote execution device is a PIM-enabled memory unit (e.g., the PIM-enabled memory unit 210 in FIG. 2), verifying 702 the new data using the locally generated error checking information for the new data prior to providing the new data to the host is carried out by the PIM error checking module generating ECC checkbits for the data and comparing the generated ECC checkbits to the ECC checkbits in the data block. If an error is encountered, the PIM unit attempts to correct the error in the data prior to providing the new data to the host. In some examples, providing the new data to the host is carried out by copying the data directly from the PIM memory region to the host memory region. In other examples, providing the new data to the host is carried out by sending the data to the host in response to a read request.

Figure 8:
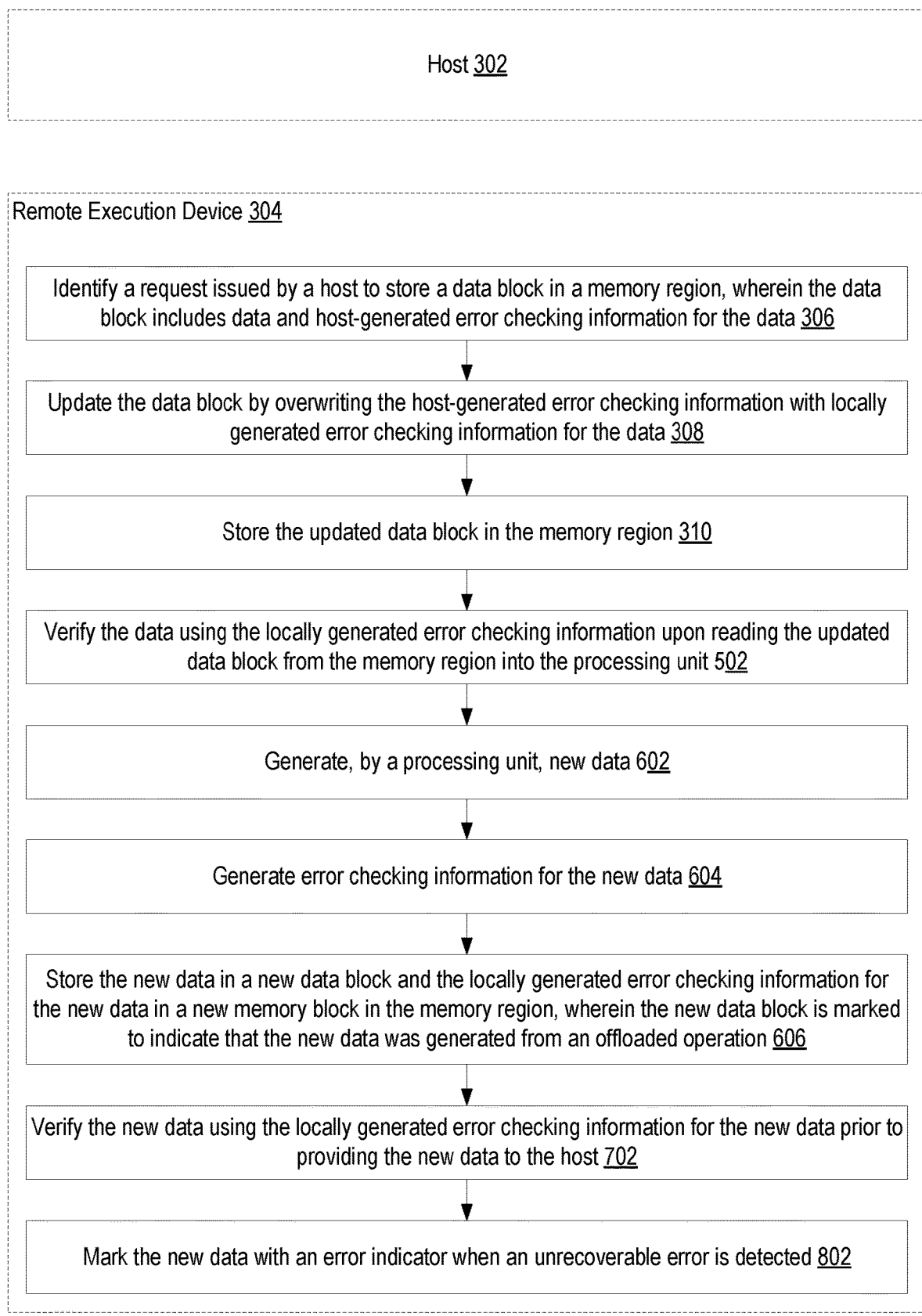
FIG. 8 sets forth a flow chart illustrating another example method of error checking data used in offloaded operations in accordance with embodiments of the present disclosure.

For further explanation, FIG. 8 sets forth a flow chart illustrating an example method for error checking data used in offloaded operations in accordance with the present disclosure. Like the example method in FIG. 7, the method in FIG. 8 also includes identifying 306 a request issued by a host to store a data block in a memory region, wherein the data block includes data and host-generated error checking information for the data updating 308 the data block by overwriting the host-generated error detection information with locally generated error checking information for the data, storing 310 the updated data block in the memory region, verifying 502 the data using the locally generated error checking information upon reading the updated data block from the memory region into the processing unit, generating 602, by the processing unit, new data, generating 604 error checking information for the new data, storing 606 the new data and the locally generated error checking information for the new data in a new memory block in the memory region, wherein the new data block is marked to indicate that the new data was generated from an offloaded operation, and verifying 702 the new data using the locally generated error checking information for the new data prior to providing the new data to the host.

The method in FIG. 8 also includes marking 802 the new data with an error indicator when an unrecoverable error is detected. If the remote execution device 304 cannot correct an error discovered when verifying the new data using the locally generated error checking information, the error may be uncorrectable thus making the data block or a portion of the data block corrupted. In some examples, marking 802 the new data with an error indicator when an unrecoverable error is detected is carried out by the remote execution device 304 indicating within the data block that the data or a portion thereof is corrupted. For example, the new data block may be marked with a poison bit to indicate that data in the data block is corrupted. When the host subsequently reads this data block from the host memory region, the host will recognize the indicator that the data is corrupted and may handle the error. In a particular example where the remote execution device is a PIM-enabled memory unit (e.g., the PIM-enabled memory unit 210 in FIG. 2), marking 802 the new data with an error indicator when an unrecoverable error is detected is carried out by the PIM-enabled memory unit marking the data block containing the PIM data as corrupted.

Figure 9:
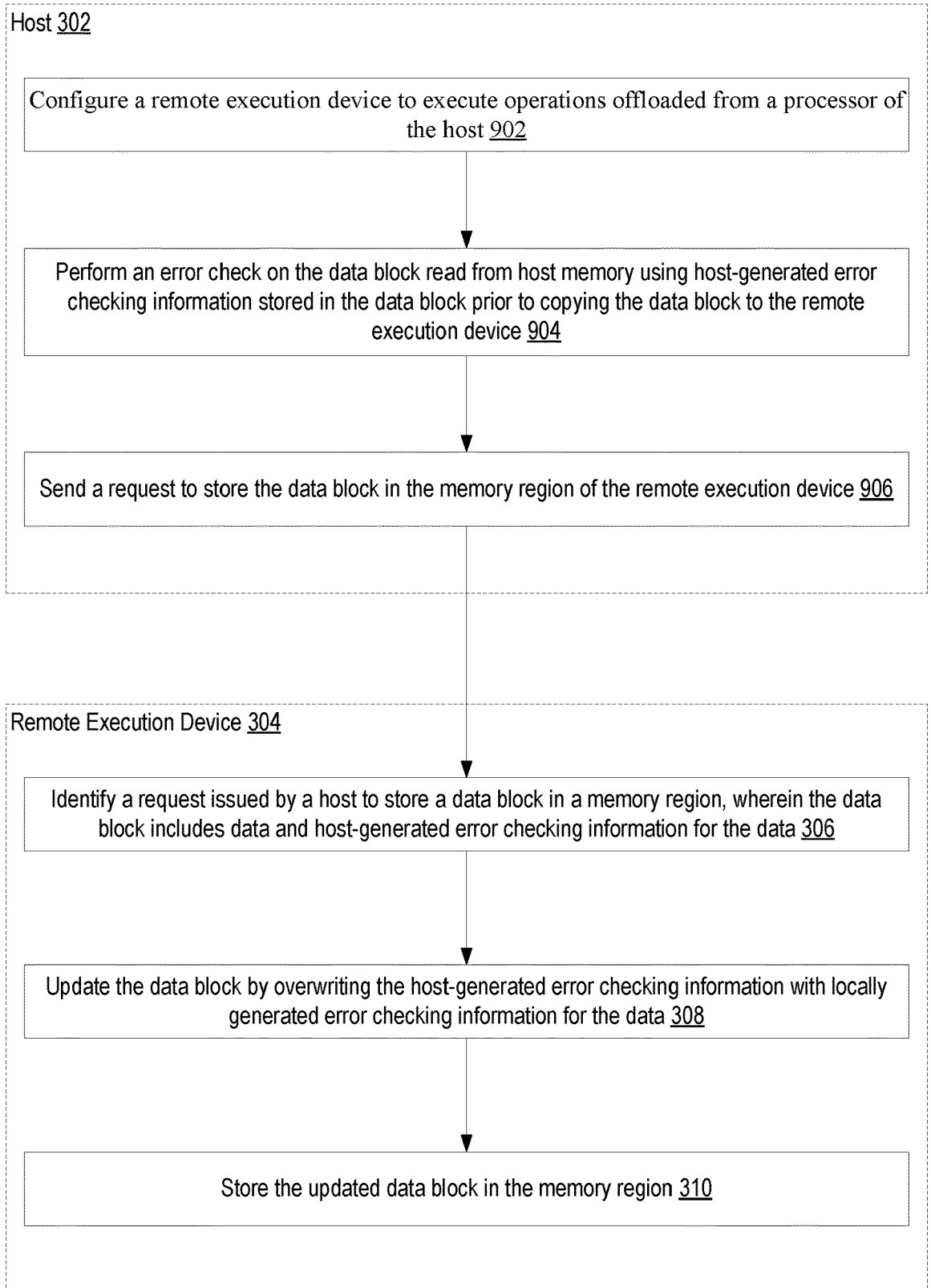
FIG. 9 sets forth a flow chart illustrating another example method of error checking data used in offloaded operations in accordance with embodiments of the present disclosure.

For further explanation, FIG. 9 sets forth a flow chart illustrating an example method for error checking data used in offloaded operations in accordance with the present disclosure. Like the example method in FIG. 3, the method in FIG. 9 also includes identifying 306 a request issued by a host to store a data block in a memory region, wherein the data block includes data and host-generated error checking information for the data updating 308 the data block by overwriting the host-generated error detection information with locally generated error checking information for the data, and storing 310 the updated data block in the memory region.

The method in FIG. 9 also includes configuring 902 a remote execution device to execute operations offloaded from a processor of the host. In some examples, configuring 902 a remote execution device to execute operations offloaded from a processor of the host is carried out by the host 302 offloading a compute kernel to the remote execution device 304 as discussed above. In a particular example where the remote execution device is a PIM-enabled memory unit (e.g., the PIM-enabled memory unit 210 in FIG. 2), configuring 902 a remote execution device to execute operations offloaded from a processor of the host is carried out by configuring the PIM unit of the PIM-enabled memory device with PIM commands.

The method in FIG. 9 also includes performing 904 an error check on the data block read from host memory using host-generated error checking information stored in the data block prior to copying the data block to the remote execution device. In some examples, performing 904 an error check on the data block read from host memory using host-generated error checking information stored in the data block prior to copying the data block to the remote execution device is carried out by an error checking module generating error checking information for the data in the data block and comparing the generated error checking information for the data with the error checking information stored in the data block. For example, the error checking module may generate ECC checkbits on the data using a host-based ECC scheme and compare the generated ECC checkbits with the ECC checkbits stored in the data block. If an error is encountered, the PIM unit attempts to correct the error in the data prior to writing the data block to the remote execution device memory region.

In some implementations, performing 904 an error check on the data block read from host memory using host-generated error checking information stored in the data block prior to copying the data block to the remote execution device includes marking 802 the data block with an error indicator when an unrecoverable error is detected. In some examples, marking 802 the data block with an error indicator when an unrecoverable error is detected is carried out by the host 302 indicating within the data block that the data or a portion thereof is corrupted. For example, the data block may be marked with a poison bit to indicate that data in the data block is corrupted. When the remote execution device 304 receives this data block, the remote execution device will recognize the indicator that the data is corrupted and may handle the error.

The method in FIG. 9 also includes sending 906 a request to store the data block in the memory region of the remote execution device. In some examples, sending 906 a request to store the data block in the memory region of the remote execution device is carried out by the host 302 issuing a write request for the data block directed to the memory region of the remote execution device 304. In a particular example where the remote execution device is a PIM-enabled memory unit (e.g., the PIM-enabled memory unit 210 in FIG. 2), the host 302 issues a write request to the PIM-enabled memory unit to store the data block in the PIM memory region.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of error checking data used in offloaded operations, the method comprising:
   identifying a request issued by a host to store a data block in a memory region of a remote execution device, wherein the data block includes data and host-generated error checking information for the data generated by the host;
   updating the data block by overwriting the host-generated error checking information included in the data block with locally generated error checking information for the data generated by the remote execution device; and
   storing the updated data block in the memory region of the remote execution device.

2. The method of claim 1 further comprising identifying a host-provided error indicator in the data block.

3. The method of claim 1, wherein the memory region is coupled to a processing unit configured to execute operations offloaded from the host.

4. The method of claim 3 further comprising verifying the data using the locally generated error checking information upon reading the updated data block from the memory region into the processing unit.

5. The method of claim 4, further comprising:
generating, by the processing unit, new data;
generating error checking information for the new data; and
storing the new data in a new data block and the locally generated error checking information for the new data in a new memory block in the memory region, wherein the new data block is marked to indicate that the new data was generated from an offloaded operation.

6. The method of claim 5 further comprising verifying the new data using the locally generated error checking information for the new data prior to providing the new data to the host.

7. The method of claim 6 further comprising marking the new data with an error indicator when an unrecoverable error is detected.

8. The method of claim 3, wherein the memory region and the processing unit are included in a processing-in-memory (PIM) device.

9. An apparatus for error checking data used in offloaded operations, the apparatus comprising:
a processing unit configured to execute operations offloaded from a host;
a memory region coupled to the processing unit; and
logic circuitry configured to:
identify a request issued by the host to store a data block in the memory region, wherein the data block includes data and host-generated error checking information for the data generated by the host;
update the data block by overwriting the host-generated error checking information included in the data block with locally generated error checking information for the data generated by an error checking module for the memory region; and
store the updated data block in the memory region.

10. The apparatus of claim 9 wherein the logic circuitry is further configured to identify a host-provided error indicator in the data block.

11. The apparatus of claim 9 wherein the logic circuitry is further configured to verify the data using the locally generated error checking information upon reading the updated data block from the memory region into the processing unit.

12. The apparatus of claim 9 wherein the logic circuitry is further configured to:
generate error checking information for new data generated by the processing unit; and
store the new data in a new data block and the locally generated error checking information for the new data in a new memory block in the memory region, wherein the new data block is marked to indicate that the new data was generated from an offloaded operation.

13. The apparatus of claim 12 wherein the logic circuitry is further configured to verify the new data using the locally generated error checking information for the new data prior to providing the new data to the host.

14. The apparatus of claim 13 wherein the logic circuitry is further configured to mark the new data with an error indicator when an unrecoverable error is detected.

15. The apparatus of claim 9, wherein the apparatus is a processing-in-memory (PIM) device.

16. A system for error checking data used in offloaded operations, the system comprising:
a host including a processor, wherein the host is configured to:
configure a remote execution device to execute operations offloaded from the processor;
perform an error check on a data block read from host memory using host-generated error checking information stored in the data block prior to copying the data block to the remote execution device; and
send a request to store the data block in a memory region of the remote execution device; and
wherein the remote execution device is configured to:
identify the request issued by the host to store the data block in the memory region of the remote execution device, wherein the data block includes data and host-generated error checking information for the data generated by the host;
update the data block by overwriting the host-generated error checking information included in the data block with locally generated error checking information for the data generated by the remote execution device; and
store the updated data block in the memory region of the remote execution device.

17. The system of claim 16 wherein the remote execution device is further configured to:
generate new data;
generate error checking information for the new data; and
store the new data in a new data block and the locally generated error checking information for the new data in a new memory block in the memory region, wherein the new data block is marked to indicate that the new data was generated from an offloaded operation.

18. The system of claim 17 wherein the remote execution device is further configured to verify the new data using the locally generated error checking information for the new data prior to providing the new data to the host.

19. The system of claim 18 wherein the remote execution device is further configured to mark the new data with an error indicator when an unrecoverable error is detected.

20. The system of claim 16, wherein the remote execution device is a processing-in-memory (PIM) device.

* * * * *